(No Model.)

H. F. BLANK.
BICYCLE.

No. 588,628.  Patented Aug. 24, 1897.

WITNESSES
J. M. Fowler Jr.
Thomas Durant

INVENTOR
Henry F. Blank
by Churchill Church
his Attorneys.

UNITED STATES PATENT OFFICE.

HENRY F. BLANK, OF QUINCY, ILLINOIS, ASSIGNOR OF ONE-THIRD TO JAMES T. PRIGMORE, OF ALMA, MISSOURI.

BICYCLE.

SPECIFICATION forming part of Letters Patent No. 588,628, dated August 24, 1897.

Application filed January 19, 1897. Serial No. 619,788. (No model.)

*To all whom it may concern:*

Be it known that I, HENRY F. BLANK, of Quincy, in the county of Adams and State of Illinois, have invented certain new and useful Improvements in Bicycles; and I do hereby declare the following to be a full, clear, and exact description of the same, reference being had to the accompanying drawings, forming a part of this specification, and to the letters of reference marked thereon.

This invention relates to improvements in the driving-gear for bicycles or other crank-propelled vehicles; and the invention has for its object to provide a simple pedal mechanism which will enable the power to be applied continuously by one or the other of the rider's feet, or, in other words, there is no dead-center upon which the application of power must cease.

The other object of the invention and coincident to the structure wherein the dead-center is overcome is to enable the power to be applied throughout a greater range of movement than a half-circle, as is ordinarily the case in vehicles of this character.

Figure 1:
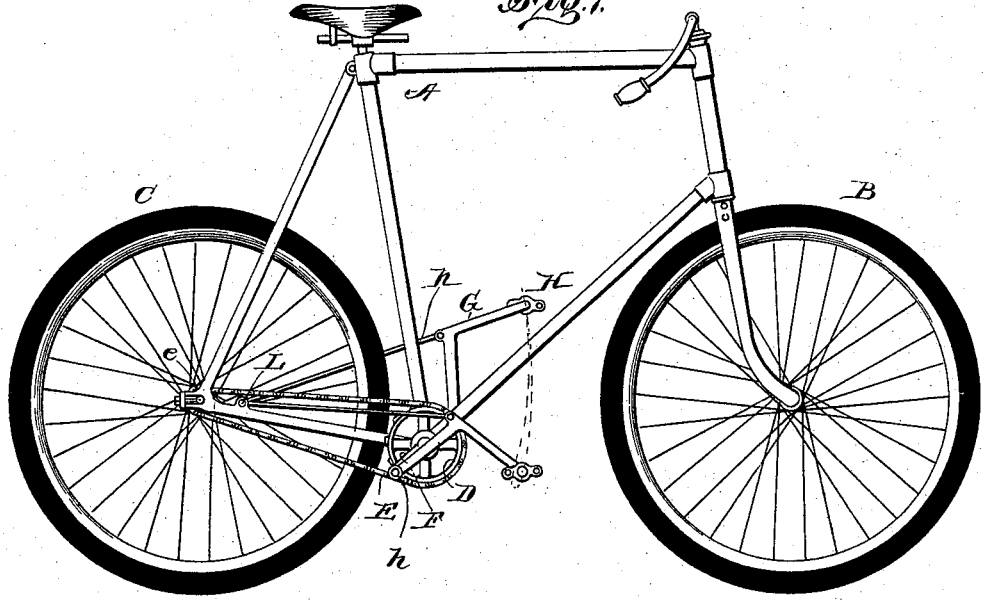
Figure 2:
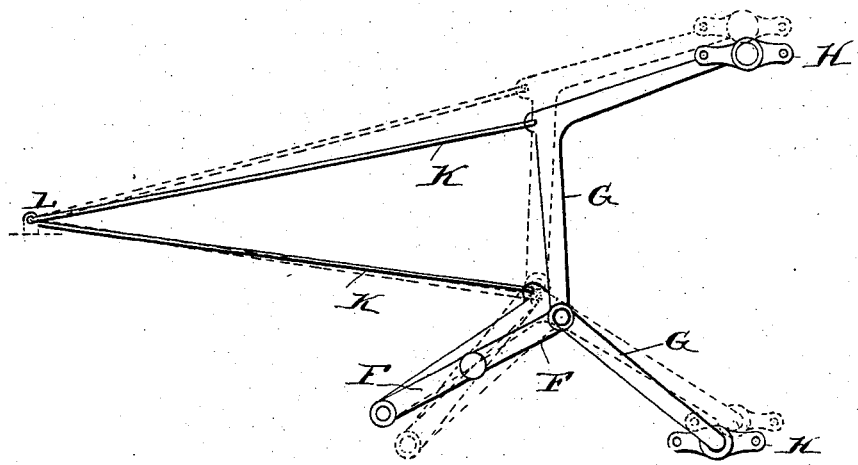

Referring to the accompanying drawings, Figure 1 is a side elevation of a bicycle embodying my present invention. Fig. 2 is a similar view of the driving mechanism alone with the crank shown in full lines in a relatively slightly-different position and in dotted lines in the same position shown in Fig. 1, illustrating the effect of the mechanism in rotating the cranks throughout more than half a circle.

Like letters of reference in both figures indicate the same parts.

The machine illustrated is of the ordinary type of diamond-frame bicycle, the framing being indicated by the letter A and the steering and driving wheels by the letters B and C, respectively. At the lower angle of the frame the usual sprocket-wheel D is mounted in suitable bearings, and from this sprocket-wheel the usual chain E extends back around a sprocket-wheel e on the driving-wheel. The sprocket-wheel D is mounted on a crank-shaft having cranks F at each end thereof, to which the power is applied. These cranks are preferably made somewhat shorter than ordinarily, and this decrease in leverage is compensated for by the length of the levers which constitute the power mechanism and which are connected thereto, as will be now explained.

Each power-lever is in the form of a bell-crank lever, (lettered G,) having the pedals H applied to one extremity and pivotally connected at their opposite extremity to the ends of the cranks at *h*. Each bell-crank lever is connected at an intermediate point to a link or rod K, which extends back along the frame of the machine and is pivotally connected to said frame preferably at a point somewhat remote from the crank-shaft, as indicated at L.

The bell-crank levers or power-levers G are preferably made at an angle somewhat greater than a right angle, although the particular angle is not essential, and the links K operate as movable fulcrums upon which the bell-cranks pivot, the pivotal connection between the bell-cranks and links being preferably approximately at the angle of the levers. With such an arrangement now when the power is applied to the pedal ends of the bell-crank levers the strain exerted on the links is a direct pull thereon, and consequently said links may be very light in cross-section and the weight of the whole apparatus is thus materially reduced.

Assume that the pedals are in the position indicated in Fig. 1, the right-hand pedal has been depressed to the limit of its movement, and power is being applied to the left-hand pedal. The effect of the application of power to the left-hand pedal will bring the right-hand pedal up to the position indicated in dotted lines in Fig. 2, which is the upward limit of its stroke, and, further than this, before the left-hand pedal has reached the extreme limit of its downward movement the right-hand pedal will have begun to descend or will have moved to the position indicated in full lines in Fig. 2, during which movement effective power may be applied to the right-hand pedal, and at the same time power is also being applied to the left-hand pedal. From the position indicated in full lines in Fig. 2 the left-hand pedal becomes inoperative as a propelling agent until it again reaches the upward extreme of its movement, and if there is any tendency for either pedal to stop on the dead-center this tendency is overcome by the application of power to the opposite pedal, which carries it beyond said center and initiates its downward movement.

The path traveled by the pedals in their movements is indicated by the dotted lines, Fig. 1, and it will be seen that in the application of the power to the pedal the power will first operate as a practically direct application to the crank, and subsequently when the crank begins to move rearwardly the bell-crank levers pivot on the forward ends of the links, and from that point on the power operates through the leverage of the bell-crank levers carrying the cranks beyond the center and giving a substantial increase to the range of movement during which effective propelling power may be applied to the pedals.

Having thus described my invention, what I claim as new is—

In a driving-gear for crank-propelled vehicles, the combination with the driving-wheel, frame, crank-shaft and cranks for rotating the same, of upwardly-extending bell-crank levers having their lower extremities or ends pivotally connected to the cranks, relatively long links pivotally connected to the bell-cranks at the angles and pivotally connected to the frame at the rear ends and pedals journaled on the upper ends of the bell-crank levers whereby the cranks may be moved across their dead-centers and the strain on the links is a longitudinal tension only; substantially as described.

HENRY F. BLANK.

Witnesses:
L. E. EMMONS,
L. E. EMMONS, Jr.